Patented Apr. 11, 1944

2,346,577

UNITED STATES PATENT OFFICE 2,346,577

MANUFACTURE OF ALKALINE EARTH METAL ACID SULPHIDES

Russell C. Hartman, Upper Darby, Pa., assignor to The Atlantic Refining Company, Philadelphia, Pa., a corporation of Pennsylvania No Drawing. Application June 17, 1942, Serial No. 447,428

7 Claims. (Cl. 23—134)

The present invention relates to improvements in the manufacture of alkaline earth metal acid sulphides, and more particularly calcium acid sulphide.

In the production of calcium acid sulphide by the reaction of hydrogen sulphide ($H_2S$) with lime in the form of an aqueous slurry, difficulty has been encountered in the preparation and handling of the lime slurry, due particularly to the high viscosity of the slurry.

I have found that this difficulty may be overcome by preparing a suspension of lime and water in a suitable inert, water-insoluble diluent, preferably a hydrocarbon mixture such as naphtha or straight run gasoline from a low sulphur petroleum crude oil. While naphtha boiling within the range 150° F. to 450° F. is preferred since it may be used at substantially atmospheric pressure, other diluents which are water-insoluble and inert to the action of lime or $H_2S$ may also be used. Such diluents include liquefied, normally gaseous hydrocarbons, i. e., propane and butane; aromatic hydrocarbons of the nature of benzene, toluene, or xylene; unreactive halogenated hydrocarbons, and the like.

In carrying out my process, I make up a slurry by adding lime, preferably in a dry state, to the naphtha or other diluent with vigorous agitation until a homogeneous suspension is obtained. The desired amount of water is then incorporated in the suspension, with vigorous agitation. In making up the lime slurry, approximately equal volumes of water and naphtha may be utilized, although some variation in the ratio of water to naphtha may be made without losing the desirable effect of the naphtha. For example, a typical mixture may comprise 100 parts by volume of water, 125 parts by volume of naphtha, and 40 parts by weight of lime. Such mixture or slurry is of sufficiently low viscosity that it may be readily handled and worked at all stages of my process. In general, mixtures comprising 100 parts by volume of water, 50 to 300 parts by volume of naphtha, and 20 to 60 parts by weight of lime have been found satisfactory. The higher the concentration of lime, the greater will be the amount of naphtha required to produce a satisfactory slurry.

In producing the calcium acid sulphide, the lime-water-naphtha slurry is preferably brought to a temperature between 140° F. and 160° F., and $H_2S$ or a gas containing $H_2S$ is brought into intimate contact with the slurry, with vigorous stirring. The heat of reaction may raise the temperature of the mixture somewhat above the initial temperature of 140° F.–160° F., and as the reaction proceeds the mixture is gradually cooled in order to keep the resulting calcium acid sulphide in solution, since the solubility of this compound increases with decrease in temperature of the reaction mixture. The final temperature may range from about 40° F. to 80° F. A concentrated solution of calcium acid sulphide is thus produced which is readily separated from the unreacted lime and naphtha by settling, filtering, or centrifuging. The reaction between the $H_2S$ and the lime slurry may be carried out at substantially atmospheric pressure or at superatmospheric pressures up to several hundred pounds per square inch.

When the $H_2S$ employed is derived from oil refinery operations, for example, from the gases produced by the cracking of sulphur-containing petroleum, it may be contaminated with small amounts of mercaptans or other organic sulphur compounds which impart an undesirable odor to the calcium acid sulphide solution. In this case, the diluent, i. e., naphtha, functions not only to reduce the viscosity of the lime slurry, but also acts as a solvent for the mercaptans, whereby such undesirable compounds are extracted from the aqueous calcium acid sulphide solution. The naphtha containing the mercaptans may be treated for the removal thereof, for example, by washing with an aqueous or aqueous alcoholic solution of caustic alkali, and the naphtha then returned for reuse in making up additional quantities of lime slurry.

My invention may be further illustrated by the following example, which is not to be construed as limiting the scope thereof:

40 parts by weight of lime was suspended in 125 parts by volume of a low sulphur petroleum naphtha, with vigorous agitation. 100 parts by volume of water was then incorporated in the lime-naphtha suspension, with vigorous stirring, to produce a lime-naphtha-water slurry. The slurry was heated to 140° F. and $H_2S$ was passed into intimate contact therewith. As the reaction for the formation of calcium acid sulphide progressed, the temperature was gradually lowered, and upon completion of the reaction the temperature was 45° F. The reaction mixture was centrifuged to remove unreacted lime and naphtha. The resulting aqueous solution contained calcium acid sulphide in a concentration of 31.3 per cent by weight.

While, herein, I have described my invention with particular reference to the production of calcium acid sulphide, my invention is also adapted to the production of other alkaline earth metal acid sulphides, including the acid sulphides of barium and strontium.

I claim:

1. A process for the manufacture of an alkaline earth metal acid sulphide, which comprises forming a slurry of water, alkaline earth metal oxide, and a substantially inert, water-insoluble liquid diluent, and intimately contacting the slurry with hydrogen sulphide.

2. A process for the manufacture of calcium acid sulphide, which comprises forming a slurry of water, lime, and a substantially inert, water-insoluble liquid diluent, and intimately contacting the slurry with hydrogen sulphide.

3. A process for the manufacture of calcium acid sulphide, which comprises forming a slurry of water, lime, and a substantially inert, water-insoluble liquid diluent, intimately contacting the slurry with hydrogen sulphide, and separating from the resulting calcium acid sulphide solution, the diluent and any unreacted lime.

4. A process for the manufacture of calcium acid sulphide, which comprises forming a slurry of water, lime, and a substantially inert, water-insoluble liquid diluent, intimately contacting the slurry with hydrogen sulphide at an initial temperature between 140° F. and 160° F., and separating from the resulting calcium acid sulphide solution, the diluent and any unreacted lime.

5. A process for the manufacture of calcium acid sulphide, which comprises forming a slurry of water, lime, and a liquid hydrocarbon diluent, and intimately contacting the slurry with hydrogen sulphide.

6. A process for the manufacture of calcium acid sulphide, which comprises forming a slurry of water, lime, and petroleum naphtha, and intimately contacting the slurry with hydrogen sulphide.

7. A process for the manufacture of calcium acid sulphide, which comprises forming a suspension of lime in petroleum naphtha, incorporating water in said suspension and intimately contacting the resulting slurry with hydrogen sulphide.

RUSSELL C. HARTMAN.